United States Patent [19]

Shirdavani

[11] Patent Number: 4,917,356
[45] Date of Patent: Apr. 17, 1990

[54] LOW PROFILE, REMOTELY OPERABLE VALVE

[76] Inventor: Hossain A. Shirdavani, 14425 NE. 37th Pl., Unit G-6, Bellevue, Wash. 98007

[21] Appl. No.: 419,545
[22] Filed: Oct. 10, 1989
[51] Int. Cl.$^4$ ............................................. F16K 31/46
[52] U.S. Cl. ................................. 251/294; 251/339; 137/351; 184/1.5
[58] Field of Search .................. 251/144, 294, 339; 137/351; 184/1.5

[56] References Cited

FOREIGN PATENT DOCUMENTS

| 0208632 | 1/1987 | European Pat. Off. | ............. 184/1.5 |
| 47702 | 7/1909 | Switzerland | ........................ 251/294 |
| 469632 | 5/1975 | U.S.S.R. | ............................. 251/294 |

Primary Examiner—John Rivell
Attorney, Agent, or Firm—Robert W. Jenny

[57] ABSTRACT

The subject valve fits into the drain fitting of crankcases and is operable by tension applied to a cable attached to it at one end. The other end of the cable is made readily accessible by attachment to a fitting attached at a convenient place to the vehicle of which the crankcase is a part. The valve is a poppet valve with a stem and is held closed by a conical compression spring. The operating cable is engaged in the valve fitting and poppet stem such that tension in the cable lifts the poppet off the valve seat to open the valve. The valve automatically closes when the tension on the cable is relieved.

1 Claim, 1 Drawing Sheet

LOW PROFILE, REMOTELY OPERABLE VALVE

BACKGROUND OF THE INVENTION

1. Field:

The subject valve is in the field of apparatus for control of fluids, more specifically valves for control of fluid out of crankcases of internal combustion engines and, still more specifically, such valves which are operable from a point remote from the valve.

2. Prior Art:

There is much prior art in this specific field. The U.S. Patents listed below disclose close prior art known to the inventor of the subject valve: 1,995,174; 3,477,459; 3,650,352; 4,086,981; 4,319,664.

However, the closest known prior art is that of U.S. patent applications Ser. No. 332,596, filed 4/3/89 and Ser. No. 388,064, filed 7/31/89, both by the subject inventor.

These examples of prior art have their relative advantages and disadvantages but, to the knowledge of the subject inventor, no valve in this specific field is known to have achieved significant commercial success. This lack of success is believed to be attributable to unacceptable relationships of cost and reliability in prior art valves. Accordingly, the prime objective of the subject invention is to provide, for draining oil from engine crankcase, a remotely operable valve which combines an acceptable combination of cost and reliability of the valve. A second objective is that the valve have a low profile to minimize the chances of damage caused by the decrease in ground clearance caused by installation of the valve.

SUMMARY OF THE INVENTION

The subject valve is threaded into the drain hole of crankcases of engines in place of the drain plug which is normally used to close off the drain hole. The valve comprises a fitting and a poppet seated against the O Ring seal at one end of the fitting, referred to as the inner end since this end is in the drain hole when the valve is installed. The fitting is a body of revolution, generally cylindrical, having an outer surface and an inner surface. The outer surface comprises screw threads at the inner end, a flange which is adjacent to the threaded portion and fits against a gasket between the flange and the drain fitting in the crankcase and a skirt portion. The outer surface of the flange is hexagonal.

The inner surface comprises a conical valve seat, grooved to hold an O Ring seal. The seat is at the inner end of the fitting. The portion of the seat facing away from the inner end forms a shoulder which serves as a seat for a conical spring which tends to hold the poppet valve closed, as described below. The outer end of the fitting is termed the skirt.

The poppet is also a body of revolution, comprising a cone having a conical surface and a stem. The conical surface is the valve surface of the poppet.

The small diameter end of the conical spring surrounds the stem. The spring is partially compressed when installed and is retained on the stem by a lock ring.

The end of the stem beyond the lock ring is slotted, the slot bifurcating the end of the stem.

The skirt of the fitting is also slotted, having a plurality of slots with their centers parallel to the axis of revolution of the fitting and equally spaced around the skirt. The end of the stem of the poppet lies essentially in the plane of the outer end of the fitting when the valve is closed. The slots in the skirt are approximately twice as deep as the slot in the valve stem.

A cable is fitted through two diametrically opposite slots in the skirt and through the slot in the stem. It is held in place by (1) ferrules on the cable, one at its end which protrudes from one of the skirt slots and the other just beyond the point at which the cable exits the opposite slot and (2) by a snap ring in a groove on the outer surface of the skirt, the groove and ring being positioned to allow clearance for the cable between the ends of the skirt slots and the snap ring.

The cable extends further to a retainer fitting which is attached to a portion of the vehicle in which the valve is used at a location convenient to the user for operation of the valve. When the valve is installed, the cable is inserted through which ever of the plurality of slots in the skirt are best oriented for the routing of the cable to the retainer fitting.

In use, to open the valve to drain the oil from the crankcase, tension is applied to the cable at the retainer fitting. The tension tightens the cable across the skirt and lifts the poppet off the O Ring seal. Release of the tension allows the spring to reseat the poppet, closing the valve.

The valve is described in more detail below with reference to the attached drawings.

DETAILED DESCRIPTION OF THE INVENTION

The subject remotely operated valve is for use as the drain valve on crankcase of internal combustion engines. It is installed in place of the conventional drain plug and is operated by the application of tension on a cable connected at one end to the valve and at the other end to a retainer which maintains that end of the cable readily accessible for operation of the valve. Relief of the tension allows the valve to automatically close.

Figure 1:
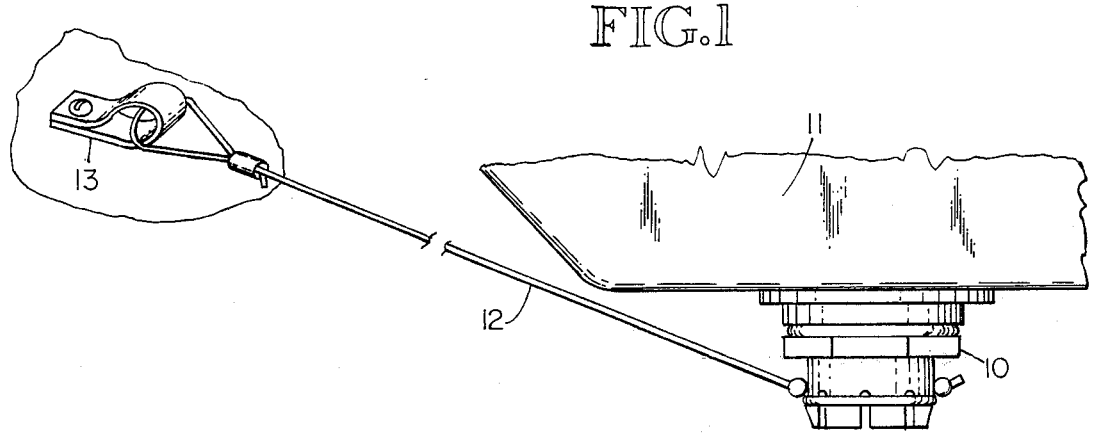
FIG. 1 is a semi-schematic view showing the valve approximately full size installed in a crankcase in a vehicle with the operative cable attached to a retainer attached to the vehicle.
Figure 2:
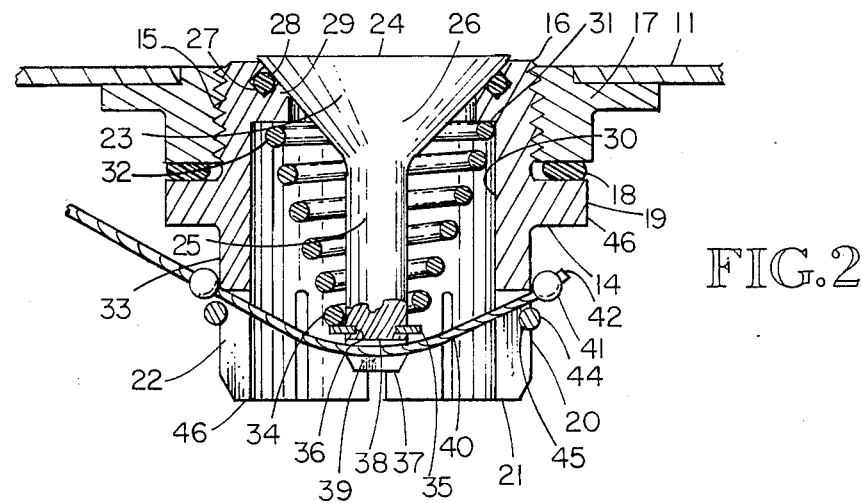
FIG. 2 is a sectional view of the valve taken in a plane through its centerline with the valve closed.

The apparatus is shown semi-schematically approximately full size in FIG. 1. The valve 10 installed in crankcase 11 is operable by application of tension to cable 12 which is held accessible by attachment to fitting 13 which is attached at an appropriate point to the vehicle of which the crankcase is a part. The valve comprises a fitting and a poppet, both of which are bodies of revolution having longitudinal axes and FIG. 2 is a sectional view of the valve taken through the axes of revolution of these parts. Fitting 14 is threaded on tis outer surface 15 at its inner end 16 into the drain hole fitting 17 attached to crankcase 11. Gasket 18 is fitted between fitting 17 and flange 19 on the outer surface of the valve fitting. Skirt portion 20, the outer end 21 of fitting 14, extends beyond the flange and there is a plurality of slots through the skirt portion, slot 22 being typical.

Poppet 23 has a conical head 24 end and a stem 25. The conical portion 26 is the valve seat portion which seats against O Ring seal 27 installed in groove 28 in flange 29 on the inner surface 30 of fitting 14. The conical portion may be spherical to enable the valve to seat properly when slightly misaligned. The O ring seal forms the valve seat in the fitting.

The underside of flange 29 is a shoulder 31 against which the large diameter end 32 of a conical spring 33 is seated. Small diameter end 34 of the spring surrounds stem 25 of the poppet and is retained on the stem by snap ring 35 in groove 36 in the stem The end 37 of the stem is slotted, bottom 38 of slot 39 being just below the snap ring.

End portion 40 of cable 12 is positioned through two diametrically opposite skirt slots and the valve stem slot and is held in place by ferrule 41 at the end 42 of the cable, ferrule 43 positioned on the cable close to the skirt and snap ring 44 in groove 45 on outer surface 15 of the fitting. When the valve is closed end 37 of the stem is essentially in the plane of end 46 of the skirt. The skirt slots are deeper than the slot in the stem, approximately twice as deep. Snap ring 44 is positioned to allow clearance for the cable between the ends of the skirt slots and the snap ring.

The cable is installed in the pair of diametrically positioned skirt slots which provide the cable the most direct routing toward fitting 13 (FIG. 1) after the valves are installed. Rim 46 of flange 19 is hexagonal to adapt it to use of a wrench for installation and removal of the valve.

Figure 3:
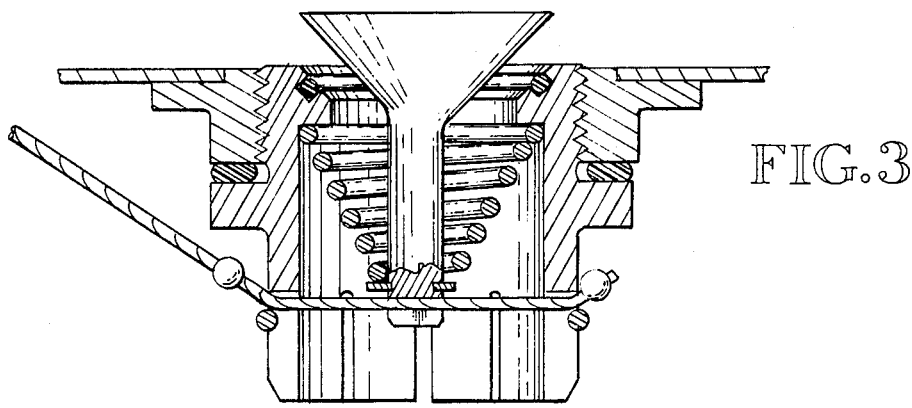
FIG. 3 is a view similar to FIG. 2 but with the valve open.

The valve is shown closed in FIG. 2 and open in FIG. 3. The valve is opened by applying tension in direction T on the cable. The tension takes up the slack in the cable across the skirt and lifts the valve seat portion off the poppet off the valve seat of the fitting, fully opening the valve. The valve closes automatically when the tension on the cable is relieved.

It is considered to be understandable from this description that the subject invention meets its objectives. It provides a remotely operable valve for draining oil from engine crankcase, the valve and operating mechanism combining low cost and reliability. Also, the valve and related mechanism have low profiles, minimizing the chances of damage caused by decrease in ground clearance resulting from installation of the valve.

It is also considered to be understandable that while one embodiment of the invention is described herein, other embodiments and modifications of the one described are possible within the scope of the invention which is limited only by the attached claims.

I claim:

1. A poppet valve comprising:
a fitting having a first longitudinal axis, an inner end, an outer end, an outer surface, an inner surface, a valve seat at said inner end, a shoulder in said inner surface adjacent to said valve seat, a skirt at said outer end, said skirt having a plurality of diametrically oppositely positioned slots, said slots having first slot ends and being parallel to said first longitudinal axis, and a snap ring groove in said outer surface,
a poppet having a head, a valve seat portion of said head and a stem portion of said head and a stem having a surface and a snap ring groove in said surface, and an end, said end having a slot, said slot having a second slot end and bifurcating said end of said stem,
a poppet stem snap ring,
a fitting snap ring,
a spring, surrounding said stem, seated on said shoulder and retained on said stem by said poppet stem snap ring in said snap ring groove in said surface of said stem,
a cable having first and second ends,
a first ferrule fastened at said first end of said cable,
a second ferrule fastened on said cable a distance from said first ferrule, said distance being such that when (1) said poppet is installed in said fitting with said valve seat portion on said valve seat and retained in said fitting by said spring positioned between said shoulder and said poppet stem snap ring and (2) said cable is positioned in two diametrically oppositely located slots of said plurality of slots and through said slot bifurcating said end of said stem and (3) said cable is retained in said two of said plurality of slots at said second slot ends by said fitting snap ring in said snap ring groove in said outer surface, said ferrules keep said cable in said bifurcating slot in said stem,
said slots being such that with said cable so retained there is slack between said first and second ferrules and said second slot end is nearer to said outer end of said fitting than said first slot ends,
whereby when tension is applied to said cable said slack is taken up, moving said poppet to compress said spring and move said valve seat portion off said valve seat, thus opening said valve and whereby when said tension is relieved, said spring closes said valve.

* * * * *